United States Patent
Topham et al.

(10) Patent No.: US 8,370,361 B2
(45) Date of Patent: Feb. 5, 2013

(54) EXTRACTING AND NORMALIZING ORGANIZATION NAMES FROM TEXT

(75) Inventors: Philip S. Topham, Orange, CA (US); Siddhartha Jonnalagadda, Orange, CA (US)

(73) Assignee: Lnx Research, LLC CA (US)

( * ) Notice: Subject to any disclaimer, the term of this patent is extended or adjusted under 35 U.S.C. 154(b) by 30 days.

(21) Appl. No.: 13/007,907

(22) Filed: Jan. 17, 2011

(65) Prior Publication Data

US 2012/0185478 A1 Jul. 19, 2012

(51) Int. Cl.
*G06F 17/30* (2006.01)
*G06F 17/00* (2006.01)
(52) U.S. Cl. ........ 707/738; 707/709; 707/751; 707/758; 707/803
(58) Field of Classification Search ............. 707/738, 707/709, 751, 103, 203, 758, 803
See application file for complete search history.

(56) References Cited

U.S. PATENT DOCUMENTS 7,792,837 B1 * 9/2010 Zhao ............................ 707/738
8,051,139 B1 * 11/2011 Musat ........................... 709/206

OTHER PUBLICATIONS

Siddhartha Jonnalagadda, Philip Topham, Graciela Gonzalez. ONER: Tool for Organization Named Entity Recognition from Affiliation Strings in PubMed Abstracts. The 3rd International Symposium on Languages in Biology and Medicine, Jeju Island, South Korea, Nov. 8-10, 2009.

Siddhartha Jonnalagadda, Philip Topham, Graciela Gonzalez. Towards Automatic Extraction of Social Networks of Organizations in PubMed Abstracts. First International Workshop on Graph Techniques for Biomedical Networks in Conjunction with IEEE International Conference on Bioinformatics and Biomedicine, Washington D.C., USA, Nov. 1-4, 2009.

Siddhartha Jonnalagadda, Philip Topham. NEMO: Extraction and normalization of organization names from PubMed affiliation strings. Journal of Biomedical Discovery and Collaboration. 2010.

* cited by examiner

*Primary Examiner* — Yicun Wu

(57) ABSTRACT

A method, apparatus and article of manufacture for extracting and normalizing organization names from text. The method uses regular expressions, certain rules and dictionaries to identify potential organization names in text, then uses word similarity metrics, clustering, and other considerations to group normalized organization names.

30 Claims, 8 Drawing Sheets

| Symbol | Organization Name |
|---|---|
| O6 | Department of Biostatistics and Bioinformatics and Duke Clinical Research Institute |
| O7 | Duke University Medical Center Durham |
| O8 | Duke University Medical Center Duke University |
| O9 | Department of Psychiatry and Behavioral Sciences Duke University Medical Center Durham |
| O10 | Box 3709 Duke University Medical Center |
| O11 | Division of Gastroenterology Duke University Medical Center Durham |
| O12 | Veterans Affairs and Duke University Medical Centers |
| O13 | Duke University Eye Center |
| O14 | Duke University Health System |
| O15 | Duke University School of Nursing |
| O16 | Duke University School of Medicine |
| O17 | Duke University Hospital |
| O18 | Duke University Pain Prevention Center |
| O19 | Duke University and Durham Veterans Affairs Medical Center |
| O20 | Preston Robert Tisch Brain Tumor Center at Duke University |

TABLE 1

FIG. 7

| PubMed ID | Sentence | Organizations Recognized | Precision% | Recall% |
|---|---|---|---|---|
| 19121441 | MetroHealth Campus, Case Western Reserve University, Cleveland, Ohio, USA. XXX @metrohealth.org | 1. Case Western Reserve University | 100 | 50 |
| 16475045 | VA Boston Healthcare System and Beth Israel Deaconess Medical Center, Harvard Medical School, Boston, MA, USA. XXX @bidmc.harvard.edu | 1. VA Boston Healthcare System and Beth Israel Deaconess Medical Center<br><br>2. Harvard Medical School | 100 | 100 |
| 19017662 | Department of Medicine, Cardiology Division, LSU Health Sciences Center, Shreveport Louisiana, USA. | 1. Department of Medicine<br><br>2. Cardiology Division<br><br>3. LSU Health Sciences Center<br><br>4. Shreveport Louisiana | 75 | 100 |

TABLE 2

FIG. 8

| | | | | | | |
|---|---|---|---|---|---|---|
| United States | Slovakia | Myanmar | | | | |
| Canada | Spain | Philippines | | | | |
| Mexico | Sweden | Singapore | | | | |
| Dominican Republic | Switzerland | Thailand | | | | |
| Jamaica | Turkey | Vietnam | | | | |
| Trinidad and Tobago | United Kingdom | Algeria | | | | |
| Barbados | Albania | Nigeria | | | | |
| Cuba | Armenia | Kenya | | | | |
| Costa Rica | Belarus | South Africa | | | | |
| El Salvador | Bosnia and Herzegovina | Morocco | | | | |
| Guatemala | Bulgaria | Egypt | | | | |
| Honduras | Croatia | Lebanon | | | | |
| Nicaragua | Cyprus | Saudi Arabia | | | | |
| Panama | Georgia | United Arab Emirates | | | | |
| Argentina | Greece | Qatar | | | | |
| Brazil | Kazakhstan | Bahrain | | | | |
| Chile | Latvia | Kuwait | | | | |
| Colombia | The Former Yugoslav Republic of Macedonia | Oman | | | | |
| Ecuador | Mali | Israel | | | | |
| Peru | Moldova | Iran | | | | |
| Venezuela | Romania | Tunisia | | | | |
| Uruguay | Serbia | Jordan | | | | |
| Austria | Slovenia | | | | | |
| Belgium | Ukraine | | | | | |
| Czech Republic | Australia | | | | | |
| Denmark | Azerbaijan | | | | | |
| Estonia | Bangladesh | | | | | |
| Finland | China | | | | | |
| France | India | | | | | |
| Germany | Japan | | | | | |
| Hungary | North Korea | | | | | |
| Iceland | South Korea | | | | | |
| Ireland | New Zealand | | | | | |
| Italy | Pakistan | | | | | |
| Lithuania | Sri Lanka | | | | | |
| Netherlands | Taiwan | | | | | |
| Norway | Uzbekistan | | | | | |
| Poland | Cambodia | | | | | |
| Portugal | Indonesia | | | | | |
| Russia | Malaysia | | | | | |

TABLE 3

FIG. 9

EXTRACTING AND NORMALIZING ORGANIZATION NAMES FROM TEXT

TECHNICAL FIELD

The present disclosure is generally related to data mining, and in particular, to techniques for the identification, standardization, and normalization of organization names appearing in stored text. The methods disclosed herein are particularly useful in the identification of Centers of Excellence and Key Opinion Leaders, sorting, grouping, and ranking of organization names in database organization text strings.

BACKGROUND

The identification of organizations that possess a strong knowledge of a specific area of research or expertise in a specific technique is of interest to a wide variety of private and public sector entities. For example, the identification of organizations most experienced in research on a disease area of interest can facilitate collaborations and communication between these organizations and also between these organizations and governmental agencies. Moreover, private sector entities, such as pharmaceutical companies, spend a percentage of their total marketing budgets on identifying the Key Opinion Leaders and organizational Centers of Excellence. Most entities, however, continue to use conventional tools like literature searches, surveys, observation methods, self-identification methods, informant methods, and socio-metric methods. These conventional methods are not entirely accuracy and in at least some instances, they are not cost effective.

Methods for extracting, normalizing and/or organizing data from text have been described previously.

For example, the problem of extraction and normalization of organization names has been studied in open domains like Wikipedia and news articles (see, e.g., Khalid et al. in "The Impact of Named Entity Normalization on Information Retrieval for Question Answering," Lecture Notes in Computer Science 4956, pp. 705-710, 2008), however, those systems had an accuracy of less than 80%.

U.S. Pat. No. 7,716,162 describes a method for normalizing geographic locations rather than organization names. Free text is used as the data source, rather than organization-related text such as a PubMed affiliation sentence. The normalization of geographic locations is based upon the generation and combination of histograms.

U.S. Published Patent Application 2010/0023515 A1 teaches a method for clustering and organizing records in a database. The clustering algorithm involves comparing deterministic cluster definitions of records against each data record under consideration to match records. These deterministic cluster definitions can employ edit distance related metrics. However, U.S. 2010/0023515 A1 does not teach modified Levenshtein distance for matching phrases or the use of centroids.

U.S. Published Patent Application 2009/0313463 A1 teaches edit distances to match database records from different database custodians, but does not teach derivation of centroids or clustering centroids or the use of regular expressions to extract phrases.

U.S. Published Patent Application 2007/0067285 A1 teaches normalization of persons from free text and citation databases as well as approximate string matching. This reference also teaches the use of clusters and centroids, but these centroids are based upon multiple weighted variables where weights are determined by statistical regression analyses. Clustering of centroids based upon geopolitical entity and the use of modified Levenshtein distance are not mentioned. Also, phrase extraction and assignment of geographic and other information using regular expressions are not taught in this reference.

U.S. Published Patent Application 2009/0182755 A1 teaches clustering of entities to determine business locations. Data extraction is taught; however, the clustering method is based upon the well-known Expectation-Maximization algorithm.

WIPO publication WO2009/158492 A1 describes a social networking based process for matching entities extracted from PubMed and includes the use of data obtained from affiliation sentences in PubMed. However, this reference does not teach the use of edit distances or word similarity metrics such as Smith-Waterman to define centroids and normalize names.

SUMMARY

There is a growing interest in new tools that can successfully and cost-effectively identify individuals and/or organizations that possess a strong knowledge of a specific area of research or expertise in a technique. By analyzing large-scale social networks of organizations, it is possible to analyze complete scientific communities with thousands of organizations in order to discover research clusters and trends. One of the components in building such a large-scale social network is a process to automatically extract organization names from databases and other data sources and match these names to known organizations.

One step in that direction is the development of automated techniques that can accurately identify organization-related text in stored organization information, for example, information stored in PubMed, other databases, and other sources of free text and/or structured text, and associate the text to known organization entities. However, the development of such techniques is no simple task because of spelling variations, formatting mistakes, and lack of consensus in the choice of words when referring to an organization. The matter is further complicated by the fact that organization names can change over time and new organizations are formed and become defunct every year.

The focus of the techniques disclosed herein is, at least in part, on extracting and normalization of organization information obtained from the organization text in PubMed abstracts and/or other databases using a combination of experimentally refined modern tools of information technology including, in some instances, regular expressions, modified edit distances, and multi-step clustering.

According to an aspect of this disclosure, a method of extracting, merging, and systematizing organization names from text is provided. The method includes extracting organization-related text from a database; identifying one or more phrases contained in said text; associating organization entities with at least one country, email address, URL, street address, city, or state included in a portion of said phrases based upon the content of said phrases; assigning at least a portion of the remaining phrases as organization entities, based upon the content of said phrases and whether nearby phrases have been assigned as organization entities; performing a first unsupervised clustering wherein said organization entities are grouped into a first plurality of clusters based upon geopolitical entity and a modified edit distance metric; performing a second unsupervised clustering wherein said first plurality of clusters are clustered into one or more second clusters based upon geopolitical entity and at least one similarity metric based on centroids of said first plurality of clusters; and designating a normalized organization name for each second cluster based upon predetermined criteria.

Other aspects, features, advantages and variations of the improvements and techniques described herein will be or will become apparent to one with skill in the art upon examination of the following figures and detailed description. It is intended that all such additional aspects, features, variations and advantages be included within this description and be protected by the accompanying claims.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

FIG. 7 is a table listing exemplary organization entities that are depicted by the vertices in the graph shown in FIG. 6.

FIG. 8 is a table listing example organization entity information records from a database.

FIG. 9 is a table listing exemplary geopolitical entities (e,g., counties) that can be associated with organization entities.

DETAILED DESCRIPTION

The following detailed description, which references to and incorporates the drawings, describes and illustrates one or more specific embodiments of what is claimed. These embodiments, offered not to limit but only to exemplify and teach the invention, are shown and described in sufficient detail to enable those skilled in the art to practice the invention defined by the claims. Thus, where appropriate to avoid obscuring the invention, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

Figure 1:
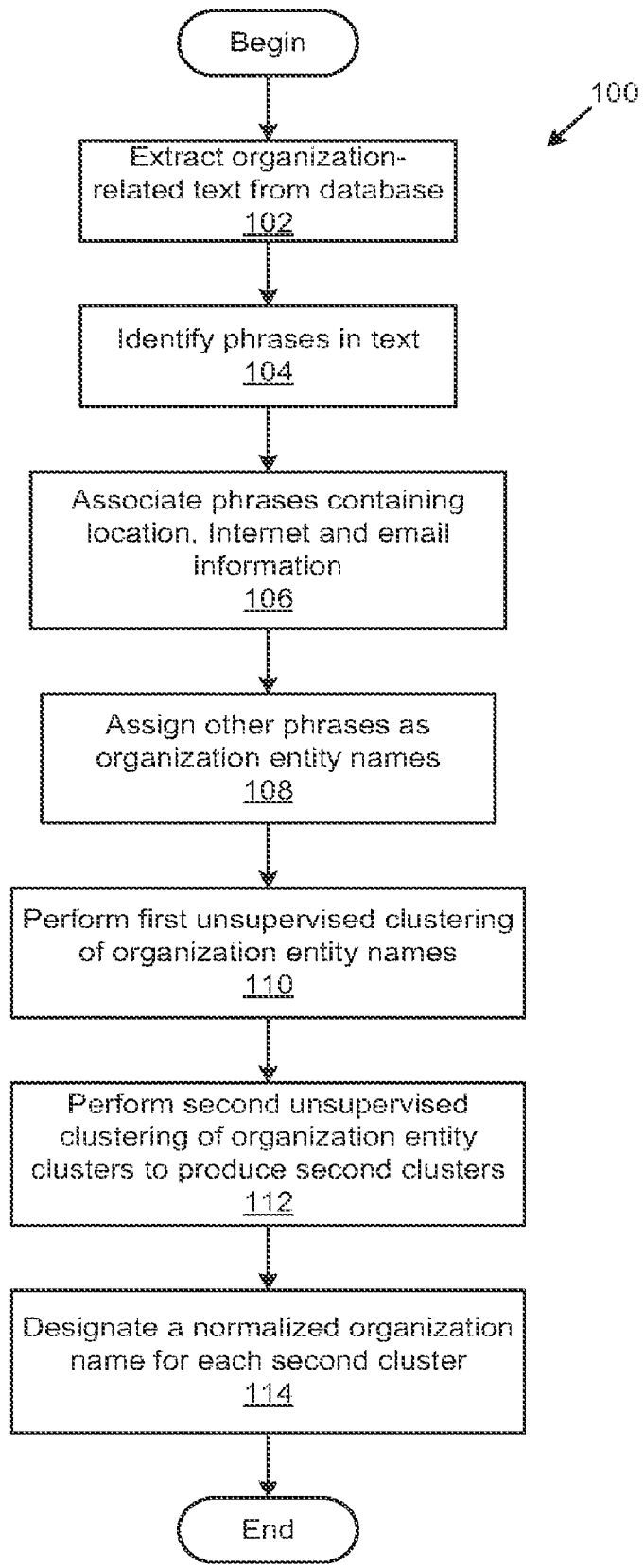
FIG. 1 is a flowchart illustrating an exemplary method of extracting, processing and normalizing organization entity names from a text database.

FIG. 1 is a flowchart 100 illustrating an exemplary method of extracting, processing and normalizing organization entity names from a text database.

Text Extraction

Organization-related text may be extracted from text in a database or any other source of free-text or semi-structured text (step 102). An exemplary text source is, PubMed. Affiliation sentences, in PubMed abstracts often identify one or more organizations that one or more authors may be affiliated with. PubMed queries to retrieve abstracts can be done manually or using automated utilities such as EFetch. Using EFetch, the affiliation sentence may be parsed using the tag "affil str."

Identification of Phrases

Phrases in the extracted organization data may be identified in text using a regular expression, other finite state automation, or other phrase identification methods (step 104). Phrases may be identified as strings corresponding according to a rule or set of rules. For example, phrases may be identified as those strings consisting of a concatenation of strings consisting of characters, other than the special characters used to separate phrases, and the special characters used to separate phrases in text. An example of a regular expression that may be used to identify phrases in organization text is (?<!(\\.))[^\\,\\;\\:\\@]+((\\,|\\;|\\:|$)(?=(\\p{Z}|[A-Z]|$))|
(\\.)(?=(\\p{Z}|$))).

The above regular expression can match the concatenation of 1 and (2a or 2b), where 1, 2a, and 2b are as follows:

1. A string consisting of characters, other than a comma, a semi-colon, a colon, an @, or a period, provided the string does not follow an exclamation mark or a period.
2a. A comma, semi-colon, colon, or end of line, provided, that it is followed by either a space, a capital character, or an end of line.
2b. A comma, semi-colon, colon, or end of line provided it is followed by either a comma then space then end of line, or a semi-colon then space then end of line, or a colon then space then end of line.

Expanding Abbreviations

Abbreviations in phrases may be identified using a variety of rules. For example, an abbreviation in a phrase may be described as a string containing capital letters followed by periods or a string starting with a capital letter and followed by one or more small letters and a period. Abbreviations in the phrases may be detected using a regular expression such as, for example, ((?<=(^|[^A-Za-z\\.]))(([A-Z]\\.?)([A-Z]\\.?)+) (?=([^A-Za-z\\.]|$))|([A-Z][A-Za-z]+\\.(\\p{Z}|$))). Using the foregoing regular expression, the abbreviations are of the form 1 or 2, where forms 1 and 2 are defined as follows:

1. Strings containing a capital letter optionally followed by a character provided the string is not preceded by a letter or a period and is not followed by an letter or a period.
2. Strings starting with a capital letter and followed by at least one letter of any case, a period, a space or an end of line.

Once detected the detected abbreviations may be expanded using a dictionary of abbreviations and their expansions which can be found on the web or other source of abbreviations and their expansions.

Associating Entities to Phrases

Although the order of associating various entity types with certain phrases can be modified, we have found through experimentation that the most effective order of association is country, email, url, address, geopolitical entity, and then organization (step 106). This order of association should not be considered limiting. However, non-organization entities tend to conform better to general patterns than the organization entities.

A country may be associated to a phrase using a program that matches one or more variables associated with the country, such as country name, region name, city name, languages, email ctdl, zip codes, with the entire phrase or a portion of the phrase.

An address may be associated to a phrase using, for example, address keywords, numbers, organization keywords. An exemplary approach would be to probe the phrase, using one or more regular expressions or finite state machines, to identify if said phrases contain address keywords located in a source of address keywords, such as a library of address keywords. The phrases are probed to identify whether or not said phrases contain numbers or directions, and are also probed to identify whether or not the phrase contains organization keywords.

A URL may be associated with a phrase using, for example, one or more regular expressions or finite state machines. Examples of a regular expressions that can be used to associate a phrase with URL are:

1. (?<=(\\s|^))(https?://|www\\.)[-\\w]+(\\.\\w[-\\w]*)+(?![\\w\\.-]*@).
2. (https?|ftp|gopher|telnet|file|notes|ms-help):((//)|(\\\\))+[\w\d:#@%/;$( )~_.?\+
3. ^http\.//[a-zA-Z0-9\-\.]+\.[a-zA-Z]{2,3}(/\S*)?$
4. (http|ftp|https):\V/[\w\-_]+(\.[\w\-_]+)+([\w\-\., @?^=%&:/~\+#]*[\w\-\@?^=% &/~\+#])?
5. ([A-Z]:\\[^/:\*\?<>\|]+\.\w{2,6})|(\\{2}[^/:\*\?<>\|]+\.\w{2,6})
6. ^(ht|f)tp(s?)\:\V/[0-9a-zA-Z]([-.\w]*[0-9a-zA-Z])*(:(0-9)*)*V?)([a-zA-Z0-9\-\.\?\,\'V\\\+&%\S#_]*)?$ A city or state may be associated with a phrase by, for example, matching the entire phrase or a portion of the phrase to the exact or partial name of a city, the exact or partial name of a state, or a postal code.

An email address may be associated with a phrase by, for example, using a regular expression or a finite state machine. Examples of a regular expression used to associate a phrase with an email address are:

1. \b[A-Za-z0-9._%-]+@[A-Za-z0-9.-]+\.[A-Za-z]{2,4}\b
2. [a-zA-Z0-9!#$%&'"*+,/=?^_'{|}~--])+(\\.[a-zA-Z0-9!#S%&'"*+/=?^_'{|}~-]+)*@([A-Za-z0-9]([A-Za-z0-9-]*[A-Za-z0-9])?\\.)+[A-Za-z0-9]([A-Za-z0-9-]*[A-Za-z0-9])
3. \w+([-+.]\w+)*@\w+([-.]\w+)*\.\w+([-.]\w+)*([,;]\s*\w+([-+]\w+)*@\w+([-.]\w+)*\.\w+([-.]\w+)*)*
4. ^([0-9a-zA-Z]([-.\w]*[0-9a-zA-Z])*@([0-9a-zA-Z][-\w]*[0-9a-zA-Z].\)+[a-zA-Z]{2,9})$
5. (\w+?@\w+?\x2E.+)

A phrase may be assigned as an organization name based upon a variety of criteria (step 108). For example, phrases which contain organization keywords, such as "hospital" or "institute," that don't begin with numbers may be assigned as organizations.

In a more specific example, the last phrase from a PubMed affiliation sentence may be assigned as an organization if the other phrases extracted from the same PubMed affiliation sentence were not assigned as organizations.

An organization is defined, for the purpose hereof as a social unit of people, systematically arranged and managed to meet a need or to pursue collective goals over a time period. An author's or researcher's affiliation is an example of an organization. Private charities, grant funding agencies, government institutions, businesses are also organizations Described and Descriptor Organization Entities A phrase may be identified as a described organization entity if said phrase contains a person's name, found, for example, in a glossary of names, a place's name, found, for example, in a glossary of place's names, or a city's name, found for example in a glossary of city's names, or if it does not only contain prepositions and/or organization keywords.

A nearby phrase is a phrase which is located in the same organization text group as the phrase under consideration. For example, two phrases in the PubMed affiliation sentence of the same article may be considered to be nearby.

Organization entities may be labeled as either described or descriptor organization entities. Described organization entities uniquely identify with a real-world organization and descriptor organization entities do not uniquely identify with a real-world organization without the presence of a described organization entity. All organizations containing a person name, a place name, or a directional modifier are recognized as described organization entities, and the rest are descriptor organization entities. Examples of described organization entities include: Jerome Upper Center for Multiple Myeloma, University of Texas, and Northwestern University. Examples of descriptor organization entities include School of Informatics and Department of Biomedical Informatics. Person names may be matched to phrase contents using names stored in a glossary. This type of glossary could be built from, for example, http://names.whitepages.com. A similar glossary of places could be built using, for example, GeoWorldMap database. It is understood that a variety of different name, place, and directional modifier sources, could be used in this context.

Language Translation

Note, before, during, or after the execution of any step in this method, text may be translated manually or automatically to English or any other language. Translation may assist, for example, in matching phrases to strings in a database or in normalizing OrgDB to one language. Google translate may be used, for example, as a translation tool in this context. We have found through experimentation that an optimal point in which to attempt to translate a phrase to English is, if and when it is determined that the program is unable to associate a country, email, url, address, city, or state with a portion of the phrase.

Clustering

In some implementations, a method called unsupervised clustering is used to group different string patterns, which essentially describe the same organization, and generate a time-relevant normalized organization name that represents each grouping of organization names. In one exemplary implementation the clustering procedure has two main steps.

Clustering Step One

The first clustering step is very effective at grouping described organization entities which have similar, but non-identical names (step 110). Non-standard words found in these may be due to, for example, unconventional word and phrase boundaries, intentional funny spelling of words, URL and formatting junk, embedded numbers, and misspellings.

In this step each new described organization entity under consideration is compared to organizations already in the database. More specifically the organization entity under consideration is compared to the centroids of all clusters having the same geopolitical entity. If the edit distance metric (defined below) indicates that the described organization entity, under consideration, is sufficiently close to the centroid of a cluster then the described organization entity under consideration is added to that cluster. If the described organization entity is not sufficiently close to the centroid of any existing cluster (as would be the case for the first described organization entity under consideration) then that described organization entity becomes the centroid of a new cluster within OrgDB. After adding a described organization entity to an existing cluster the centroid is recomputed.

Note that the described organization entity name, from the cluster, which has the lowest sum of modified edit distances across all other described organization entity names, within the cluster, is designated as the centroid of the cluster. Note, through experimentation we have found that the use of the modified edit distance metric to define the centroid of a cluster to be much faster than the typical method of calculating the average of the vector representations of the elements of the cluster, in Euclidean Vector Space.

The modified edit distance method employed in this invention is a modified version of a Levenshtein distance. Through experimentation we have found that Levenshtein distance computed on the word level is the most effect at ensuring that two phrases corresponding to different organizations are not matched. When comparing a described organization entity to a centroid, stop words may first be identified and removed from the described organization entity using a dictionary of stop words. Word similarity scores are determined by comparing the words in the described organization entities to the words in the centroids we have found that a very effective word similarity score, for two words A and B, is equal to the Smith-Waterman Alignment score of A and B divided by the average length of A and B. We have found that local sequence alignment algorithms, such as Smith-Waterman, are preferable to global sequence alignment algorithms for accurately matching organization names. Global sequence alignment algorithms tend to overmatch organization names. Note, a sequence similarity or word similarity is quantitative score of how close two strings based on the lexical resemblance of the corresponding sequences of characters. If the word similarity score is greater than or equal to a threshold, for example 0.85, then the words are identified as the same. If the word similarity score is less than the threshold, then the words are identified as different. The word similarity scores for each described organization entity—centroid comparison are fed into a Levenshtein method based algorithm. The penalty for a gap of a word is the length of the word. The penalty for the mismatch of two words is the sum of their lengths. A described organization entity under consideration is included in a cluster if its Levenshtein distance is less than or equal to a specific number, such as 4, from the centroid. Note Levenshtein distance is a metric used in information theory and computer science. The Levenshtein distance metric measures the amount of difference between two sequences. The Levenshtein distance between two strings is defined as the minimum number of edits needed to transform one string into the other, with the allowable edit operations being insertion, deletion, or substitution of a single character. For an explanation of stop word dictionaries see C. Fox et al. (A Stop List for General Text, *Association for Computing Machinery*, 24, 19-21 (1989), which is incorporated by reference in its entirety. For an explanation of Smith-Waterman scoring see Smith et al. (Identification of Common Molecular Subsequences, *Journal of Molecular Biology*, 147, 195-197 (1981)), which is incorporated by reference in its entirety.

Clustering Step Two

The second clustering step is very effective at grouping described organization entities which represent the same organization despite being having substantially different words (step 112). This situation occurs often when there is a lack of consensus in the choice of words when referring to a particular organization. For example, The David Geffen School of Medicine at the University of California" and "DG School of Medicine at the University of California at Los Angeles" are very different, but represent the same organization.

The step can be considered as a type of "connected components algorithm" or "graph based algorithm." In this step the clusters are represent vertices in a graph and the vertices are connected with one another by edges. An edge exists between the cluster under consideration and another cluster if, and only if, they are not from a different city or state, or other pre-chosen geopolitical parameter, e.g., they are from the same geopolitical entity, and their corresponding centroids A and B score at or above a particular similarity threshold, for example 0.90, on the Extended Smith-Waterman score. We define the Extended Smith-Waterman score here as the Smith-Waterman Alignment score of A and B divided by the minimum of the lengths of A and B, which is an example of a similarity metric. We have found that this scoring system works well in that it tends to be conservative and avoids overmatching of dissimilar organizations. The disjoint connected component for the cluster under consideration initially consists of just the cluster and is then expanded to include those clusters connected to the cluster under consideration by an edge. Then clusters connected to those clusters by edges are included, building a connected component around the original centroid of depth 2. Expansion may end at depth 2 or greater. Certain clusters may be removed from the connected component based upon information associated with the clusters, for instance, the presence or absence of certain authors and organizations associated with the described organization entities. Finally, the highest ranking organization in the connected component, based upon publication related data such as publication count or other information, is declared the normalized organization name for all described organization entities in the cluster under consideration (step 114).

The disjoint connected component may be manually cleaned before, during, or after step two by, for example, removing clusters where the centroid is a descriptor entity, expanding unambiguous abbreviations, and correcting spelling mistakes. The centroids and connected components may be re-determined after cleaning.

Note, a semantic similarity which we define as a quantitative score of how close two strings based on the meaning conveyed by them, may be used in the place of the sequence similarity metrics described above.

When the above process is carried out on a large number of organization text entries, we refer resultant database as OrgDB. For example, a particularly useful embodiment of OrgDB is the database which is constructed using the steps described above in connection with FIG. 1 on at least 100,000 randomly selected affiliation sentences from PubMed or other organization text sources from PubMed or other database.

It is understood that other word and phrase similarity metrics, and thresholds may be used to achieve results which are similar to those obtained by the metrics and thresholds described above. The exact metrics and thresholds presented here should not limit the scope of the claims.

Each entry in the OrgDB database is a cluster that has at least three or more of the following features: a) Centroid String, b) List of the organizations in the cluster, c) The distance (DIST) matrix containing inter-component distance using the string similarity metric, optionally d) the PubMed IDs of the articles whose one of the organizations belong to the cluster, e) the city, state and country of the cluster. The Centroid String is the name of the organization entity that has the least sum of distances from all organizations in the cluster (as inferred from the DIST matrix); this is evaluated each time a new organization gets added into the cluster. The geopolitical entity of the cluster may be, for example, the set union of the geopolitical entity of all organizations; i.e., if the parsing process isn't able to identify the city of one of the organizations but is able to identify the city of another organization in the same cluster, then the city of the latter organization becomes the city of the cluster.

Figure 2:
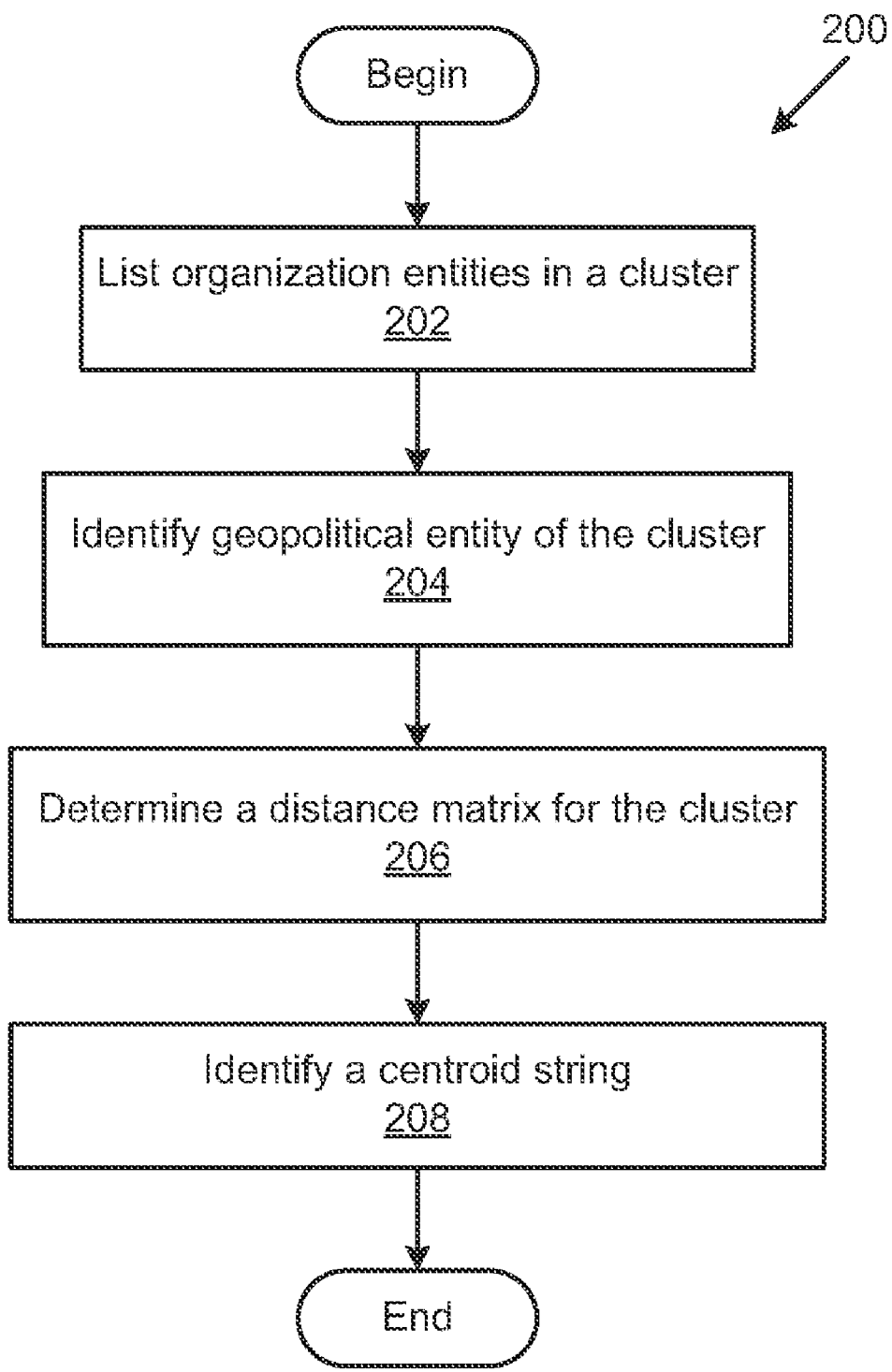
FIG. 2 is a flowchart illustrating an exemplary method of defining a cluster of organization entity names.

Each entry in the OrgDB may be created by the exemplary method illustrated by the flowchart 200 of FIG. 2. In step 202 the organization entities (names) in a cluster are listed. The geopolitical entity, e.g., country, state, region, address or the like, corresponding to the cluster is identified (step 204). In step 206, the distance matrix for the cluster is calculated, and in step 208, the Centroid String is identified.

It is understood that OrgDB may have other features not listed above, and that the appended claims are not limited to those features.

Figure 3:
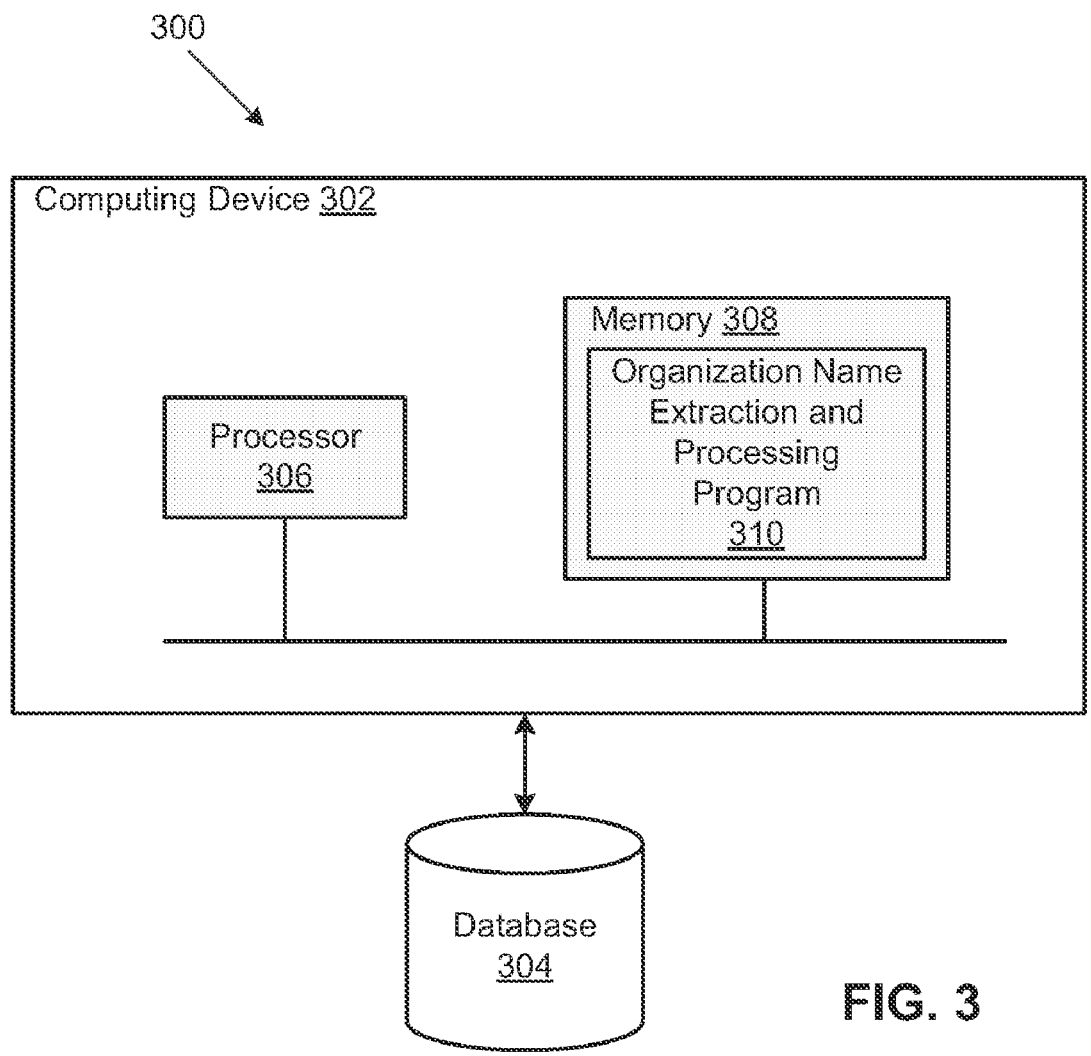
FIG. 3 is a diagram illustrating an exemplary apparatus for performing the method of FIG. 1.

FIG. 3 is a conceptual block diagram illustrating certain components of an exemplary system 300 for performing any of the methods described above in connection with FIGS. 1 and 2. The system 300 includes an apparatus, such as computing device 302 having a processor 306 and a memory 308 in communication with one another. Among other things, the memory 308 stores an organization name extraction and processing computer program 310. The memory 308 may also store other programs and/or data. The processor 306 includes one or more digital circuits, such as microprocessors, DSPs, embedded controllers, or intellectual property (IP) cores for executing programs stored in the memory 308. The memory 308 may be any suitable computer storage medium capable of storing instructions and/or data.

The computing device 302 receives information from database 304, and in turn, the computer program 310 produces organization entity names by executing some or all of the method steps described above in connection with FIGS. 1 and/or 2. More specifically, the program 310 includes instructions executable by the processor 306 for causing the computing device 302 to perform some or all of the steps described above in connection with FIGS. 1 and/or 2.

EXAMPLE 1

We provide here an example of using the methods described above.

Figure 4:
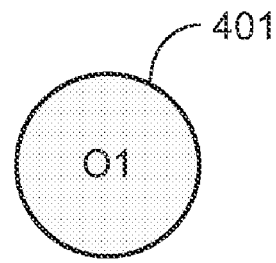
FIG. 4 is an exemplary graph which represents the initial connected component in the second clustering, the clustering step two stage of Example 1.

For the PubMed article with PubMed ID 16849888 the PubMed affiliation sentence is Duke University Medical Center and Duke Clinical Research Institute, Durham, N.C. 27710, USA. Duke University Medical Center and Duke Clinical Research Institute are represented by the vertex. Using the text extraction, phrase identification, and entity matching processes described above in connection with FIG. 1, it was determined that the country was the USA, the state was North Carolina, the Zip Code was 27710, the city was Durham, and the organization was Duke University Medical Center and Duke Clinical Research Institute. According to Step One of the clustering procedure this organization entity was not close enough to any of the current organization clusters. Therefore, it became the centroid of a new cluster. FIG. 4 displays Duke University Medical Center and Duke Clinical Research Institute as the centroid of its own cluster (O1) 401.

Figure 5:
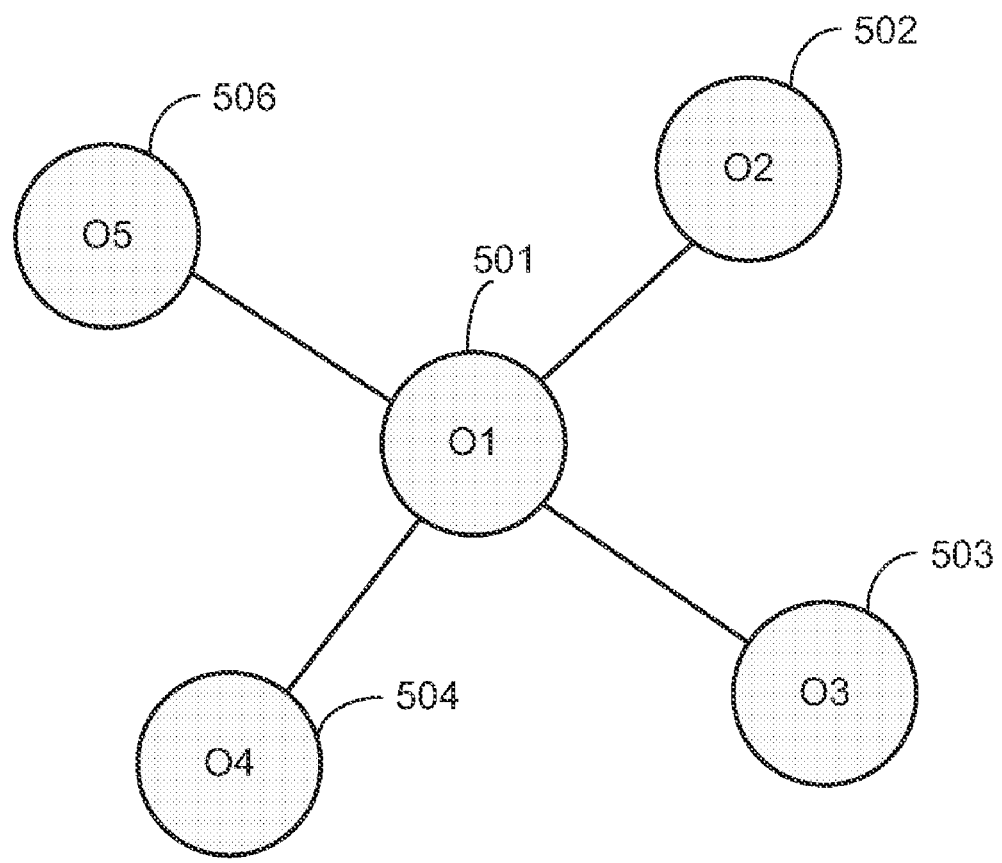
FIG. 5 is an exemplary graph which represents the connected components in the clustering step two stage of Example 1 after the first degree connections have been added.

Next, we initiated clustering Step Two. This resulted in the exemplary graph shown in FIG. 5. A connected component is added to the Duke University Medical Center and Duke Clinical Research Institute (O1) 501 cluster, which includes four other organizations. The presence of edges is defined by the cities and states of the clusters and the Extended Smith-Waterman score. The added organizations are Duke Clinical Research institute (O2) 502, Duke University Medical Center (O3) 503, Duke University Medical Center (O4) 504, and Duke University (O5) 505. Fifteen other organizations are now added because they possess edges between themselves and the four previously added organizations. This is illustrated by the exemplary graph shown in FIG. 6. The cluster now includes Duke University Medical Center and Duke Clinical Research Institute (O1) 601, Duke Clinical Research Institute (O2) 602, Duke University Medical Center (O3) 603, Duke University Medical Center (O4) 604, and Duke University (O5) 605, and the fifteen other organizations (O6-O20) 606-620. These organizations are listed in Table 1 of FIG. 7.

Figure 6:
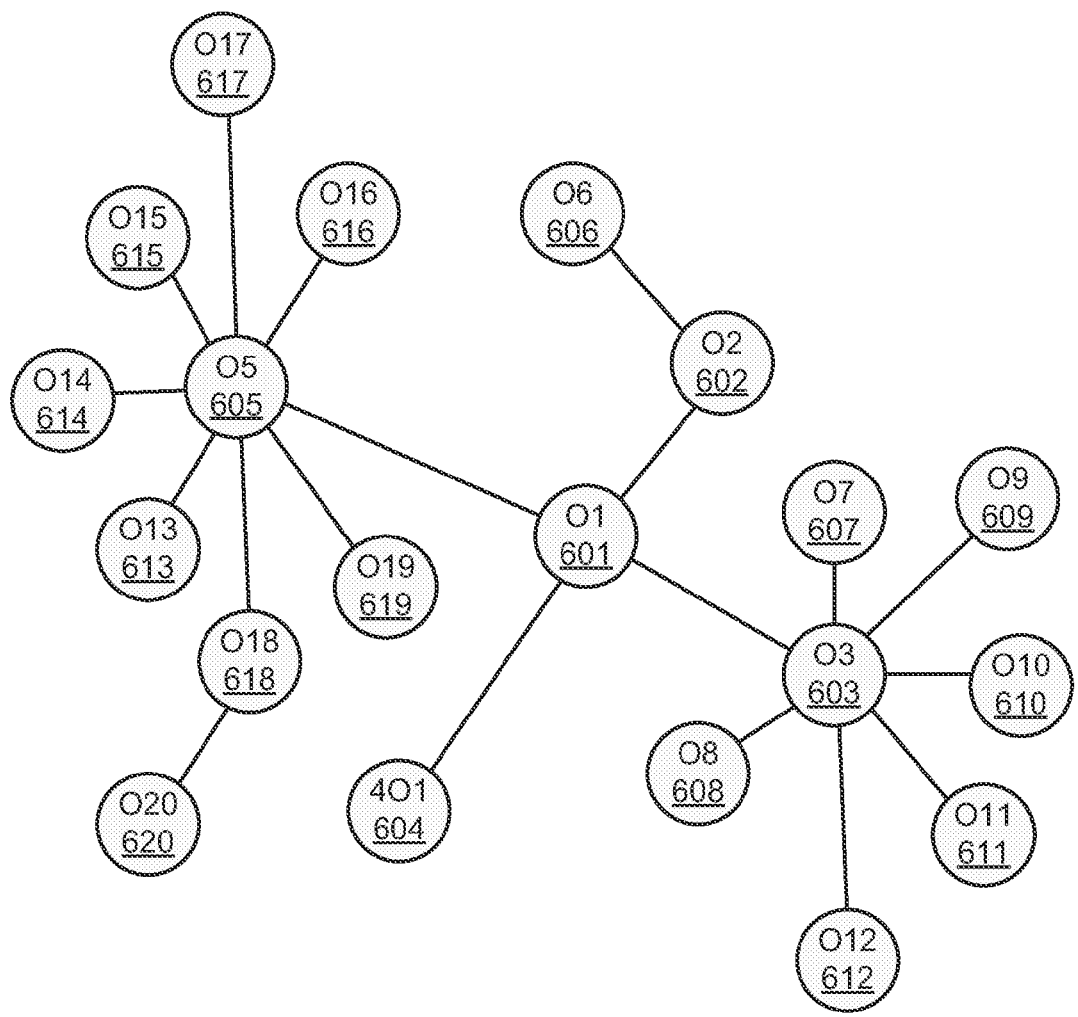
FIG. 6 is a graph which represents the connected components in the clustering step two stage of Example 1 after the second degree connections have been added.

FIG. 6 depicts a "depth 2" cluster or connected component. Fifteen other organizations are have been added because they possess edges between themselves and the four previously added organizations. The existence of these edges was determined by the cities and states of their clusters and the Extended Smith-Waterman scores between themselves and the four cluster centroids which were added because of their direct connections to Duke University Medical Center and Duke Clinical Research Institute.

In this example, we stop the expansion of the graph at depth level 2 to avoid overmatching organization entities. The connected component gives the set of all the synonyms of the organization being normalized. Depending on the objectives of normalization, the criterion to choose the representative organization varies. One possible choice is to assume the centroid string of the cluster with the largest number of publications as the normalized name. Going by this criterion, Duke University Medical Center becomes the normalized name for Duke University Medical Center and Duke Clinical Research Institute.

The following examples pertain to the identification and normalization of geographic entities and/or organization entities from affiliation sentences of Medline. The method described in connection with FIG. 1 was employed and results were obtained. Analysts reviewed the results and evaluated them using precision, recall, and F-measure as judgment criteria.

In the examples below precision is defined as the number of entities correctly extracted divided by the total number of entities extracted.

Recall is defined as the number of relevant documents by a search divided by the total number of existing relevant documents.

The F-measure is the harmonic mean of precision and recall. That is; the F-measure is equal to 2*(Precision*Recall)/(Precision+Recall).

EXAMPLE 2

In this example, the method described in connection with FIG. 1 was used to a) identify whether or not an affiliation sentence contains information indicating that a paper under consideration originates from the USA, and b) extract organizations and related entities from the USA affiliations.

We obtained 6042 MEDLINE abstracts (with affiliation) related to "Atrial Fibrillation" published between the years 2004 and 2008. Out of the 6042 articles, the method described herein predicted that 1828 articles were from USA. There were two false negatives and zero false positives.

Thus, in this example, the method had a precision of 100.0%, recall of 99.9%, and an F-measure of 100.0% in determining whether the article is from USA.

The 1828 articles predicted to be from USA were processed to obtain the information about organizations and other entities. Analysts found 39 sentences with false positives and 2 sentences with false negatives. Some examples are shown in Table 2 of FIG. 8.

Since there are multiple organizations in a sentence, a false positive in the sentence does not make the whole result for the sentence a false positive if at least one organization is correctly recognized; same is the case with false negative. In the first example, MetroHealth campus is not recognized as an organization and in the last example, the city Shreveport, La. is wrongly recognized as an organization. So, the precision and recall are calculated for each sentence separately as shown in Table 2. The average precision and average recall are calculated by finding the arithmetic mean of the precision and recall of all the sentences. In this example, the average precision is 99.2%, the average recall is 99.9% and so, the average F-measure is 99.6% for extracting organization names from USA affiliation sentences.

EXAMPLE 3

In this example, the method described in connection with FIG. 1 was used to normalize organizations extracted from USA affiliations.

We obtained 4135 articles related to a study on "Antiangiogenesis" indexed in PubMed between the years 2004 and 2008. Out of the 4135 articles, the disclosed method identified 2509 articles from USA and extracted the organization names along with their geopolitical entities. The normalization process identified each article with a unique standard organization. In this example, there were thirteen false positives (0.5%). Because we used the sophisticated Step Two clustering procedure involving a connected component based recalculation as opposed to the straightforward string similarity calculation, a richer set of synonyms is discovered than more basic approaches. For example, Harvard Medical School appeared in the synonym sets of most of its affiliates, including Beth Israel Deaconess Medical Center, Brigham and Women's Hospital, Cambridge Hospital, Children's Hospital Boston, The Dana-Farber Cancer Institute, The Forsyth Institute, Harvard Pilgrim Health Care, Hebrew Senior Life, Joslin Diabetes Center, Judge Baker Children's Center, Massachusetts Eye and Ear Infirmary, Massachusetts General Hospital, McLean Hospital, Mount Auburn Hospital, The Schepens Eye Research Institute, Spaulding Rehabilitation Hospital, VA Boston Healthcare System. Since Harvard Medical School has the highest rank in OrgDB, according to our chosen criterion of normalization, all these organizations got automatically identified with it.

EXAMPLE 4

In this example, the method described above in connection with FIG. 1 was used to determine the name of the country from an affiliation sentence. We evaluated the performance of the method on articles from all 103 countries listed in Table 3 of FIG. 9.

We obtained 4910 MEDLINE abstracts related to "Glaucoma" published between the years 2004 and 2008 and used the method to detect countries represented by the abstracts. The analysts found 4746 true positives, one false positive and 23 false negatives. These false negatives were mainly because of the articles were from the countries other than those in Table 3. Thus, in this example, the method had precision of 100.0%, recall of 99.5% and f-score of 99.8% for detecting countries. The other known system by Yu, et al. (see Yu et al. "An automatic method to generate domain-specific investigator networks using PubMed abstracts." *BMC Medical Informatics and Decision Making* (2007), 7, 17) has a precision of 94.0%, a recall of 92.1% and an F-measure of only 93.0% for detecting country names on a different dataset.

EXAMPLE 5

In this example, the method was used to extract organizations and related entities from all affiliations.

We used 4000 abstracts with affiliations related to "*Staphylococcus aureus*". The method achieved a precision of 100.0%, recall of 97.5% and f-score of 98.7% in determining organizations.

The functionality of the systems, devices, apparatuses and their respective components, as well as the method steps and blocks described, herein may be implemented in hardware, software and/or firmware executed by a processor or similar device, or stored in a computer-readable medium, or any suitable combination thereof. The software/firmware may be one or more programs having sets of instructions code segments) executable by one or more digital circuits or processors, such as microprocessors, DSPs, embedded controllers, or intellectual property (IP) cores. If implemented in software/firmware, the instructions or code may be stored on one or more computer-readable media. Computer-readable medium includes both computer storage medium and communication medium, including any non-transitory medium that facilitates transfer of a computer program from one place to another. A storage medium may be any available medium that can be accessed by a computer. By way of example, and not limitation, such computer-readable medium can comprise RAM, ROM, EEPROM, NAND/NOR Flash, CD-ROM, or other solid-state storage, optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Other embodiments and modifications of the methods, devices, systems and apparatuses described above will occur readily to those of ordinary skill in the art in view of these teachings. Thus, the foregoing description is illustrative and not restrictive. The invention is to be limited only by the following claims, which cover all such other embodiments and modifications, when viewed in conjunction with the above specification and accompanying drawings. The scope of the invention should, therefore, not be limited to the above description, but instead should be determined with reference to the appended claims along with their fall scope of equivalents.

What is claimed is:

1. In an apparatus, a method of extracting, merging, and systematizing organization names from text, comprising:
    at a computer-readable medium having one or more microprocessors configured to host and execute one or more programs,
    extracting organization-related text from a database;
    identifying one or more phrases contained in said text;
    associating organization entities with at least one country, email address, URL, street address, city, or state of a portion of said phrases based upon the content of said phrases;
    assigning at least a portion of the remaining phrases as organization entities, based upon the content of said phrases and whether nearby phrases have been assigned as organization entities;
    performing a first unsupervised clustering wherein said organization entities are grouped into a first plurality of clusters based upon geopolitical entity and a modified edit distance metric, wherein each of the first clusters includes a list of all organization entities in the cluster;

wherein each new organization entity under consideration is compared to the centroids of all clusters having the same geopolitical entity, wherein if the modified edit distance metric indicates that the described organization entity, under consideration, matches above a predetermined threshold to the centroid of a cluster, then the described organization entity under consideration is added to that cluster, wherein if the described organization entity does not match above a predetermined threshold to the centroid of any existing cluster, then that described organization entity becomes the centroid of a new cluster;

performing a second unsupervised clustering wherein said first plurality of clusters are clustered into one or more second clusters based upon geopolitical entity and at least one similarity metric based on centroids of said first plurality of clusters, wherein the second unsupervised clustering includes connected components clustering, wherein the second unsupervised clustering groups organization entities which represent the same organization despite being having substantially different words; and designating a normalized organization name for each second cluster based upon predetermined criteria.

2. The method of claim 1, further comprising:
separating the organization entities into described and descriptor organization entities.

3. The method of claim 1, further comprising:
removing at least one cluster from said second plurality of clusters based upon one or more predetermined rules or one or more observed anomalies.

4. The method of claim 1, further comprising:
expanding abbreviations in the said phrases.

5. The method of claim 1, wherein the organization-related text is extracted from PubMed affiliation sentences.

6. The method of claim 1, wherein the modified edit distance metric is a Levenshtein distance calculated at a word level, after stop words have been removed; where the threshold for word matching (WS) is approximately 0.85; where WS =(Smith-Waterman Score of word a and word b)/(Average length of word a and word b); and where the Levenshtein score threshold is approximately four.

7. The method of claim 1, wherein each of the first clusters includes a list of all organization entities in the cluster; the geopolitical entities of the cluster which is a set union of all geopolitical entities of the organization entities in the cluster; a distance matrix containing inter-component distances defined using a string similarity metric; and a centroid string where the centroid string is equal to organization entity which possesses the least sum of distances from all organization entities in the cluster.

8. The method of claim 1, wherein the first and second unsupervised clustering includes agglomerative partitional clustering of said organization entities, said organization entities comprising constituent string tokens; wherein the threshold for the similarity of pairs of organization entities is a fixed value determined using edit distance; and wherein the threshold for similarity of constituent string tokens is a variable value determined using a local sequence alignment algorithm.

9. The method of claim 8, wherein the local sequence alignment algorithm used is the Smith-Waterman algorithm or variation thereof.

10. The method of claim 8, wherein the edit distance algorithm is a form of a Levenshtein distance.

11. The method of claim 8, wherein the centroid of each cluster is assigned as the cluster member with the least sum of edit distances from the other organization entities.

12. The method of claim 8, wherein the organization entity is the affiliation string in bibliographic database and the constituent entities are the words or tokens in the affiliation string.

13. The method of claim 12, wherein the bibliographic database is MEDLINE.

14. The method of claim 1, wherein the first unsupervised clustering includes finding related affiliation strings and normalizing non-standard usage in the organization entity names in the affiliation strings.

15. The method of claim 14, wherein the connected component includes strings that represent vertices and edges between the vertices which are present only if the strings are sufficiently similar.

16. The method of claim 15, wherein the similarity metric is based on sequence similarity.

17. The method of claim 15, wherein the similarity is based on semantic similarity.

18. The method of claim 15, wherein the similarity is based on a weighted local sequence alignment algorithm with the weights depending on the sizes of the strings.

19. The method of claim 18, wherein the local sequence alignment algorithm used is Smith-Waterman algorithm.

20. The method of claim 14, wherein expansion of the connected component is followed by pruning of organization entities based upon one or more criteria.

21. The method of claim 1, further comprising:
automatically identifying key organization entities in a subject area using an online bibliographic database.

22. The method of claim 21, wherein the online bibliographic database is MEDLINE.

23. The method of claim 21, wherein the method uses social network analysis.

24. The method of claim 1, further comprising:
translating and transliterating said text to a single language.

25. An apparatus for obtaining organization names from text, comprising:
at a computer-readable medium having one or more microprocessors configured to host and execute one or more programs,
means for extracting organization-related text from a database;
means for identifying one or more phrases contained in said text;
means for associating at least one country, email address, URL, street address, city, or state with a portion of said phrases based upon the content of said phrases;
means for assigning at least a portion of the remaining phrases as organization entities, based upon the content of said phrases and whether nearby phrases have been assigned as organization entities;
means for performing a first unsupervised clustering wherein said organization entities are grouped into a first plurality of clusters based upon geopolitical entity and a modified edit distance metric, wherein each of the first clusters includes a list of all organization entities in the cluster; wherein each new organization entity under consideration is compared to the centroids of all clusters having the same geopolitical entity, wherein if the modified edit distance metric indicates that the described organization entity, under consideration, matches above a predetermined threshold to the centroid of a cluster, then the described organization entity under consideration is added to that cluster, wherein if the described organization entity does not match above a predetermined threshold to the centroid of any existing cluster, then that described organization entity becomes the centroid of a new cluster;

means for performing a second unsupervised clustering wherein said first plurality of clusters are clustered into one or more second clusters based upon geopolitical entity and at least one similarity metric based on centroids of said first plurality of clusters, wherein the second unsupervised clustering includes connected components clustering, wherein the second unsupervised clustering groups organization entities which represent the same organization despite being having substantially different words; and means for designating a normalized organization name for each second cluster based upon predetermined criteria.

26. The apparatus of claim 25, wherein the organization-related text is extracted from PubMed affiliation sentences.

27. The apparatus of claim 25, wherein the modified edit distance metric is the Levenshtein distance calculated at the word level, after stop words have been removed; where the threshold for word matching (WS) is approximately 0.85; where WS =(Smith-Waterman Score of word a and word b) /(Average length of word a and word b); and where the Levenshtein score threshold is approximately four.

28. The apparatus of claim 26, wherein the modified edit distance metric is the Levenshtein distance calculated at the word level, after stop words have been removed; where the threshold for word matching (WS) is approximately 0.85; where WS =(Smith-Waterman Score of word a and word b) /(Average length of word a and word b); and where the Levenshtein score threshold is approximately four.

29. The apparatus of claim 25, wherein the unsupervised clustering algorithm includes a list of all organizations in each the cluster; the geopolitical entity of the cluster which is a set union of all geopolitical entities of the entities in the cluster; a distance matrix containing inter-component distances defined using a string similarity metric; and a centroid string where said centroid string is equal to organization entity which possesses the least sum of distances from all organizations in the cluster.

30. A computer-readable medium, excluding signals, storing a set of instructions executable by one or more processors, comprising:

code for extracting organization-related text from a database;

code for identifying one or more phrases contained in said text;

code for associating at least one country, email address, URL, street address, city, or state with a portion of said phrases based upon the content of said phrases;

code for assigning at least a portion of the remaining phrases as organization entities, based upon the content of said phrases and whether nearby phrases have been assigned as organization entities;

code for performing a first unsupervised clustering wherein said organization entities are grouped into a first plurality of clusters based upon geopolitical entity and a modified edit distance metric, wherein each of the first clusters includes a list of all organization entities in the cluster; wherein each new organization entity under consideration is compared to the centroids of all clusters having the same geopolitical entity, wherein if the modified edit distance metric indicates that the described organization entity, under consideration, matches above a predetermined threshold to the centroid of a cluster, then the described organization entity under consideration is added to that cluster, wherein if the described organization entity does not match above a predetermined threshold to the centroid of any existing cluster, then that described organization entity becomes the centroid of a new cluster;

code for performing a second unsupervised clustering wherein said first plurality of clusters are clustered into one or more second clusters based upon geopolitical entity and at least one similarity metric based on centroids of said first plurality of clusters, wherein the second unsupervised clustering includes connected components clustering, wherein the second unsupervised clustering groups organization entities which represent the same organization despite being having substantially different words; and code for designating a normalized organization name for each second cluster based upon predetermined criteria.

* * * * *